United States Patent [19]
Verhille et al.
[11] 3,733,439
[45] May 15, 1973

[54] AUTOMATIC TELECOMMUNICATION SWITCHING SYSTEM

[75] Inventors: Henri Albert Julia Verhille, B-2200 Borgerhout; Oswald Pieter Maria Donkers, B-2100 Deurne, both of Belgium

[73] Assignee: International Standard Electric Corporation, New York, N.Y.

[22] Filed: Dec. 14, 1970

[21] Appl. No.: 97,681

[30] Foreign Application Priority Data

Dec. 31, 1969 Netherlands ........................6919631

[52] U.S. Cl. ................................................179/18 E
[51] Int. Cl. ................................................H04q 3/42
[58] Field of Search ......................................179/18 E

[56] References Cited

UNITED STATES PATENTS 3,423,539 1/1969 Page et al. ............................179/18 E

*Primary Examiner*—William C. Cooper
*Attorney*—C. Cornell Remsen Jr., Walter J. Baum, Paul W. Hemminger, Charles L. Johnson Jr., James B. Raden, Delbert P. Warner and Marvin M. Chaban

[57] ABSTRACT

In a crossbar switching system, the functions of marker circuits are broken down such that there are two common marker circuits for the entire system and two regular marker circuits for each group of crossbar switches. Each marker circuit of each type has a selection matrix, the common marker being used to select the regular marker circuit to be used. The use of common markers reduces the possibility of double testing, reduces the equipment necessary and speeds switching.

13 Claims, 8 Drawing Figures

Figure 1:
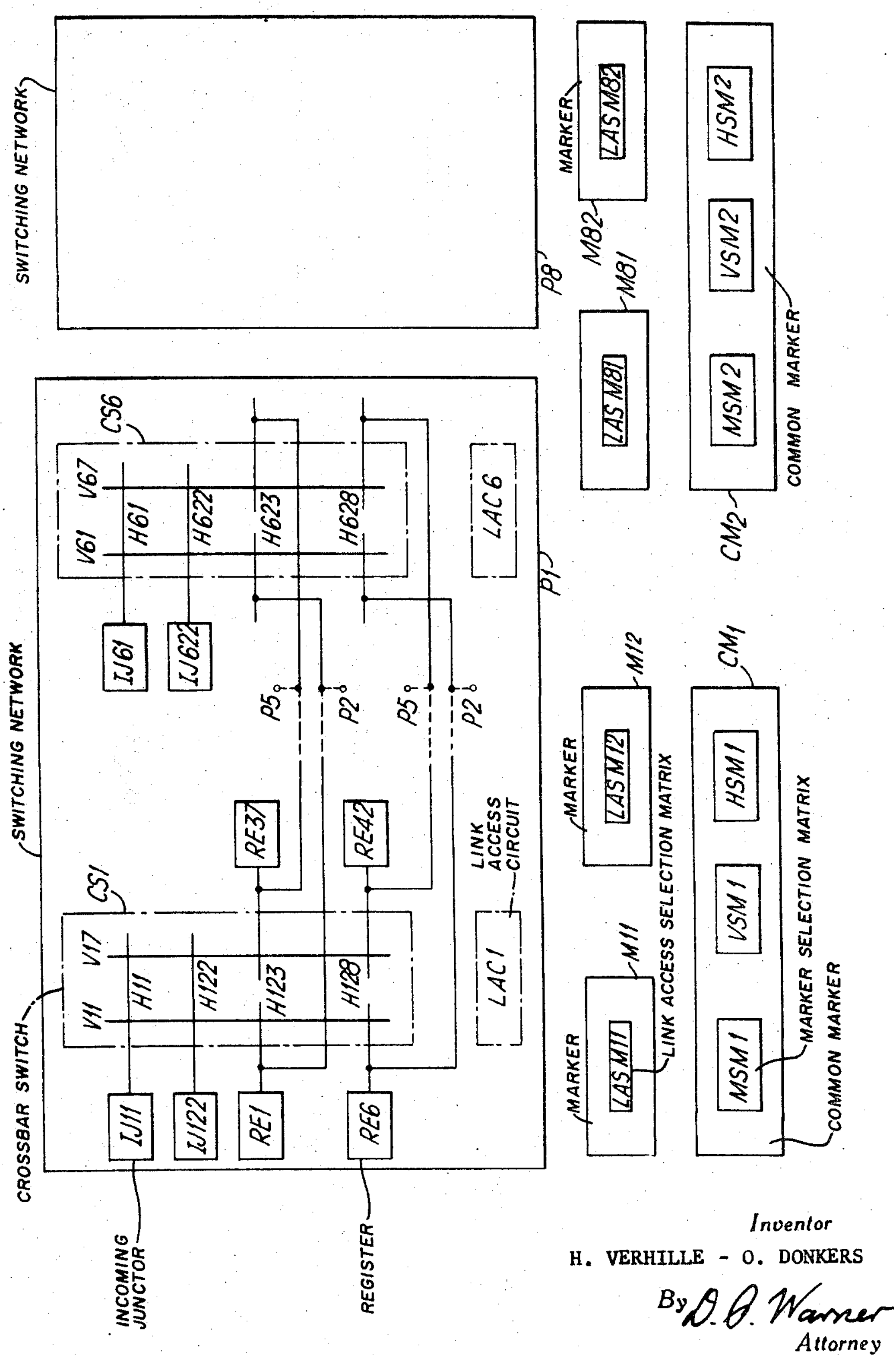
Figure 2:
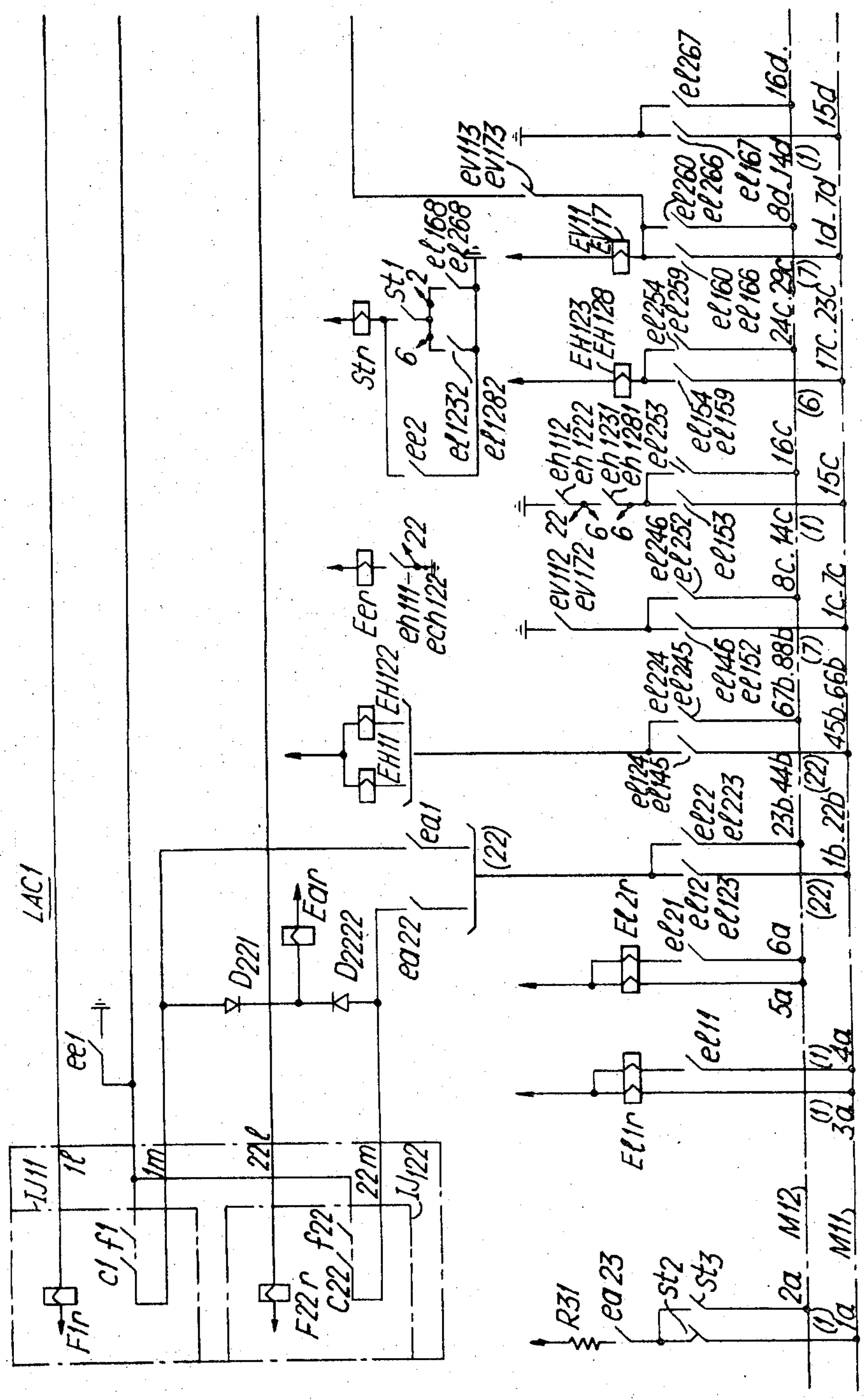
Figure 3:
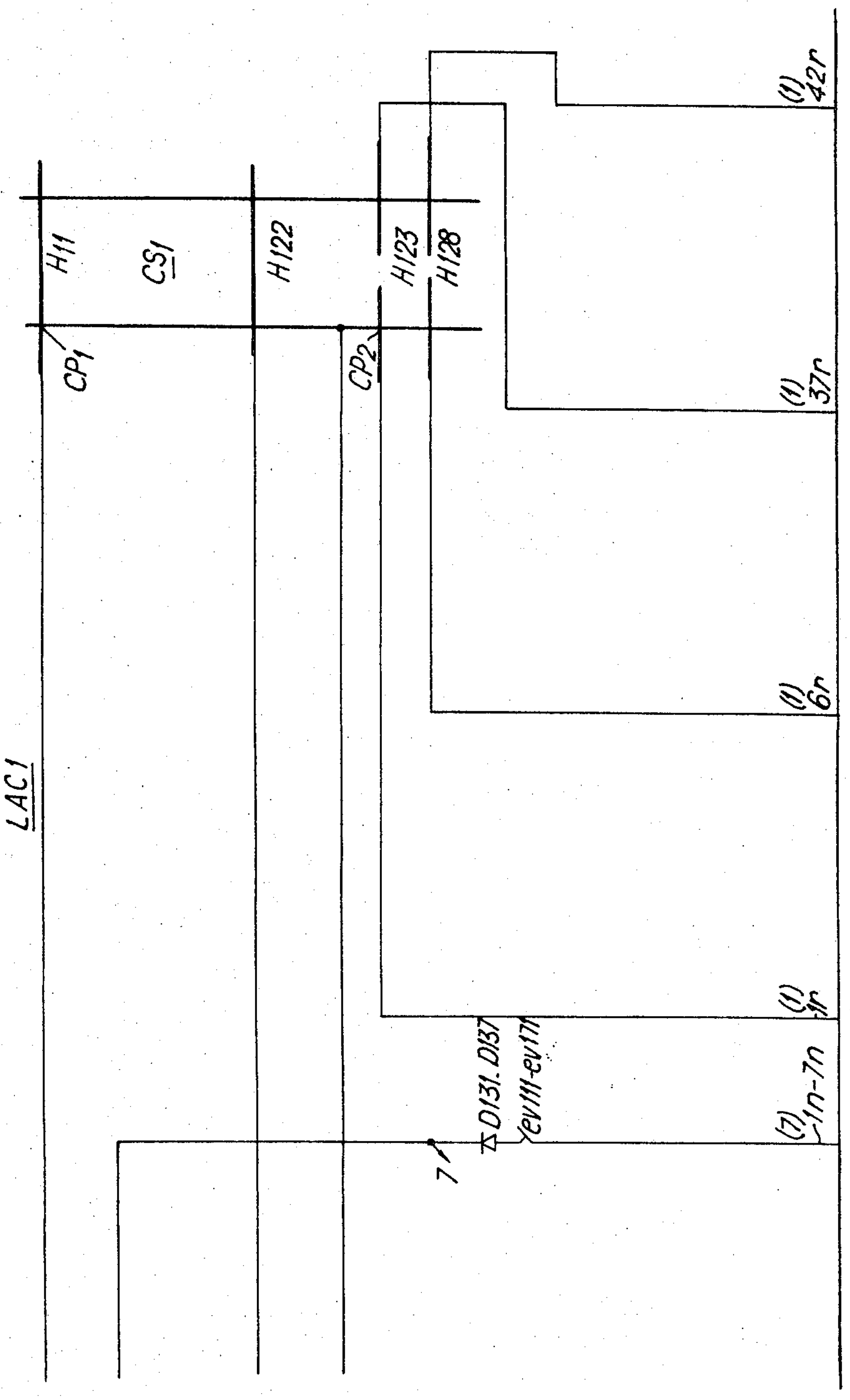

Inventor
H. VERHILLE - O. DONKERS
By D. G. Warner
Attorney

AUTOMATIC TELECOMMUNICATION SWITCHING SYSTEM

The present invention relates to an automatic telecommunication switching system including a switching network constituted by a plurality of groups of switches each with a plurality of crosspoints, a plurality of control circuits each individually associated to a distinct one of said switches and each including a first set of first control elements and a second set of second control elements for the crosspoints of the corresponding switch, each crosspoint being operated subsequent to the operation of a first and a second control element, and a plurality of first common control means one of which at least for each of said groups of switches and each able to be temporarily connected to a selected one of the control circuits of the corresponding group.

Such an automatic telecommunication switching system is already known from the Dutch Pat. application No. 6,814,916 (H.VERHILLE ET AL. 6–1). In this known switching system, for instance the selection of the control elements to be operated is performed in the control circuits, so that each such control circuit includes relatively complex selection means and the switching system is costly especially when the total number of control circuits is high.

An object of the present invention is therefore to provide an automatic telecommunication switching system of the above type including a reduced total number of selection means.

The present automatic telecommunication switching system is particularly characterized in that said first common control means connected to said selected control circuit is able to intervene at least in the selection of a first control element among at least a plurality of first control elements of said first set included in said selected control circuit, and that said system further includes at least one second common control means for a plurality of said first common control means, said second common control means being able to be temporarily connected to said first common control means connected to said selected control circuit and to intervene at least in the selection of a second control element of said second set included in said selected control circuit.

Another characteristic feature of the present automatic telecommunication switching system is that each of said first common control means includes first selection means to select a single control circuit in the corresponding group and second selection means to select in said selected control circuit a single first control element among said plurality of first control elements of said first set, and that each of said second common control means includes third selection means to select a single first common control means and fourth selection means to select in said selected control circuit a single second control element of said second set.

Another object of the present invention is to provide an automatic telecommunication switching system of the above type, but which is capable of establishing a connection through said switching network in a very rapid way. This is for instance necessary when the automatic telecommunication switching system is a tool switching system and must be able to co-operate with a direct switching system since in this case a connection between a calling incoming junctor and a free register connected to said switching network must be established in a minimum of time.

According to another feature of the invention said selection means are of the fast lock-out selection type disclosed for instance in the copending Dutch patent application of even date and entitled "Selection circuit" (S.SIMON-H.VERHILLE 28–7) corresponding to U.S. Patent Application Ser. No. 96,754, filed Dec. 10, 1970, now Pat. No. 3,667,001.

In brief the invention is based on the insight that by removing the selection means of the control elements, i.e. of the horizontal and vertical bars of the crossbar switches used to establish connections between incoming junctors and registers, from the control circuits of these switches and by locating selection means of the fast lock-out selection type in first and second common control means, i.e. in markers and common markers, a considerable gain of selection means is obtained and a fast interconnection can be realized between a calling incoming junctor and a free register.

Figure 4:
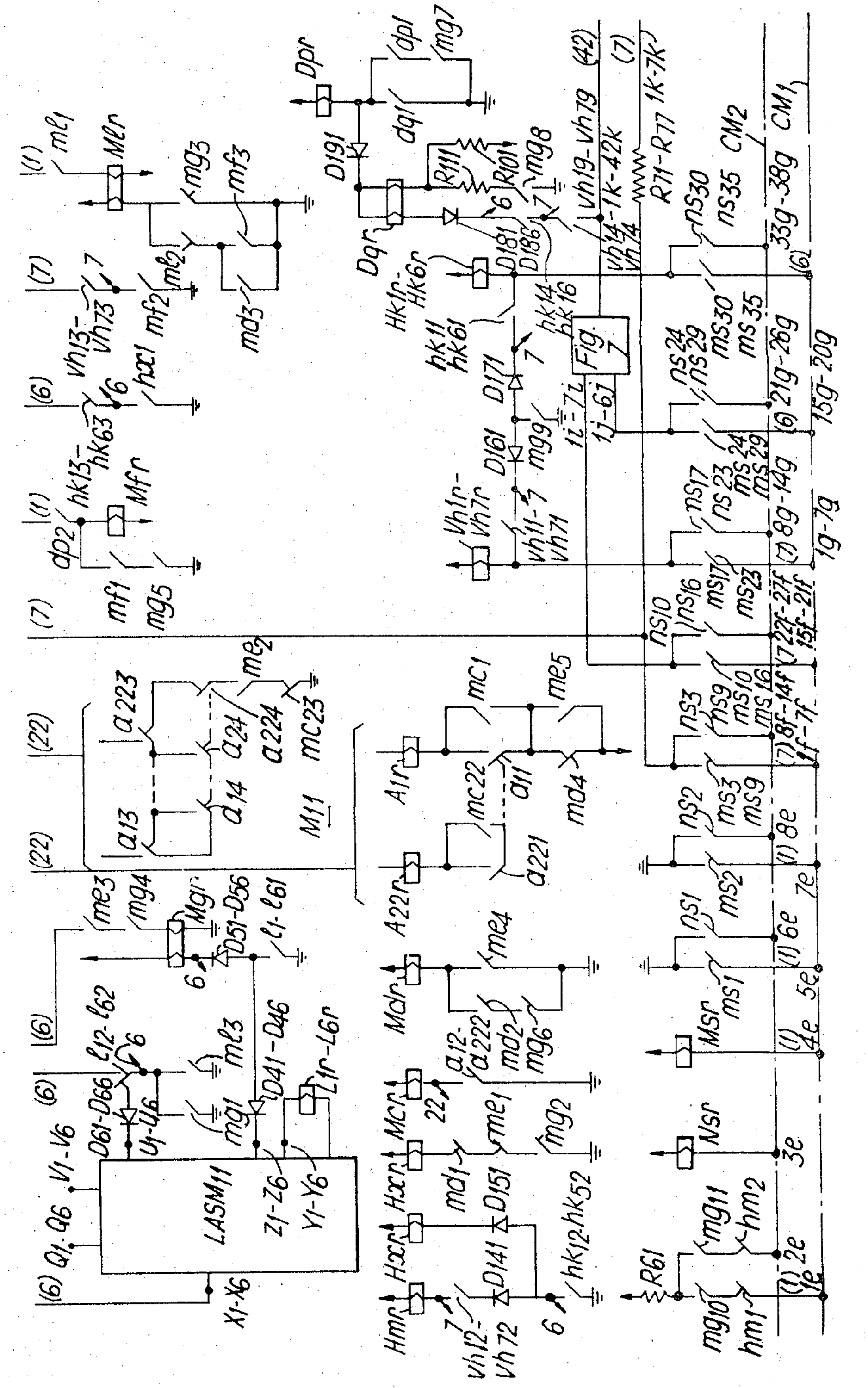
Figure 5:
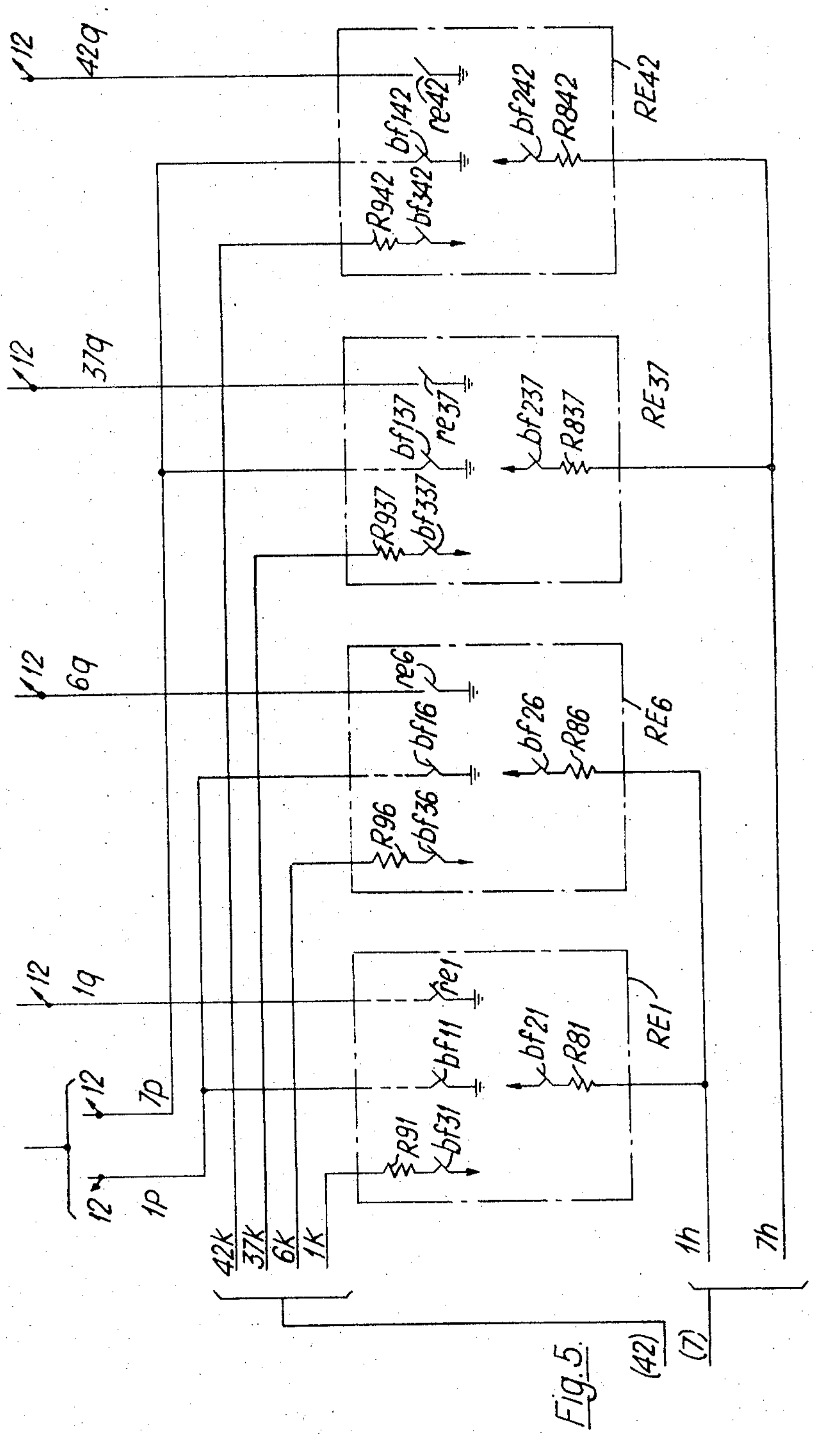
Figure 6:
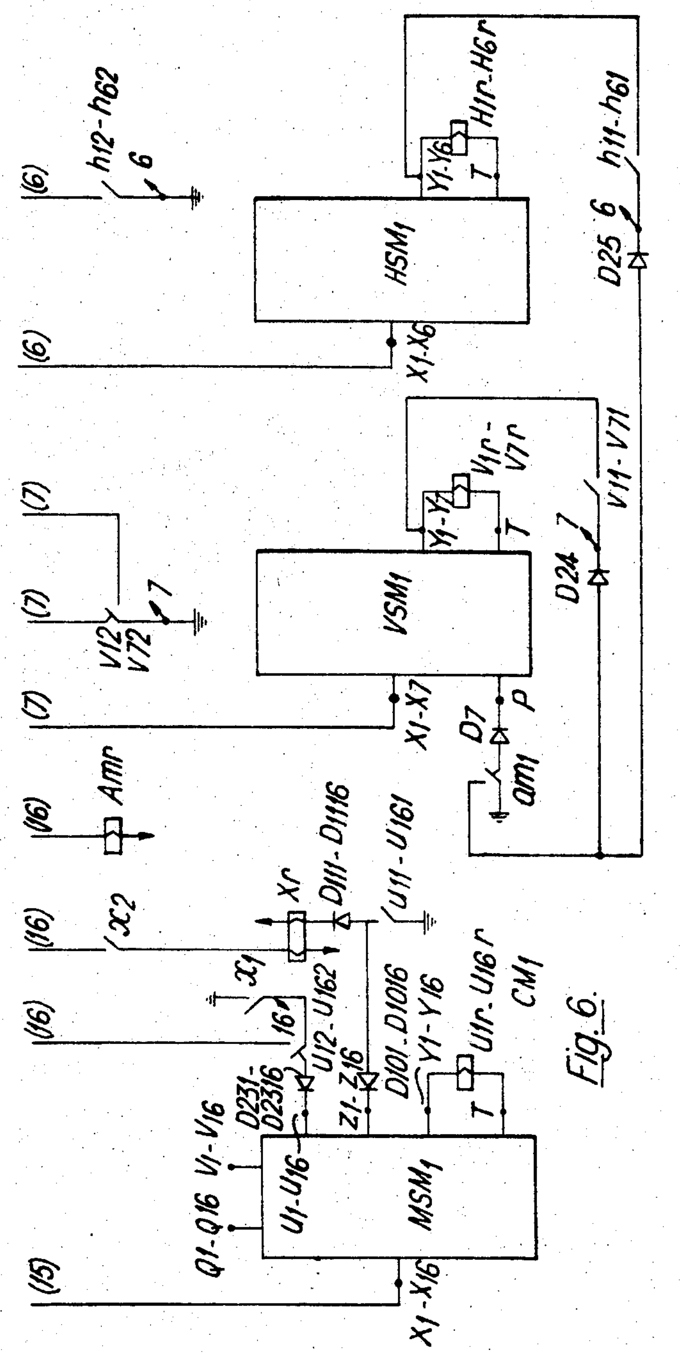
Figure 8:
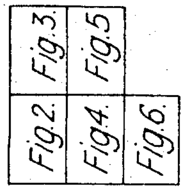
Figure 7:
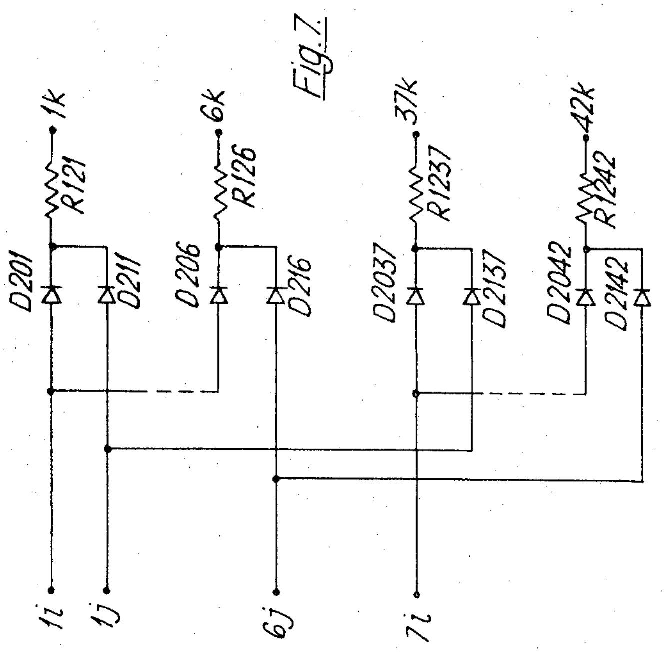

The above mentioned and other objects and features of the invention will become more apparent and the invention itself will be best understood by referring to the following description of an embodiment taken in conjunction with the accompanying drawings in which:

FIG. 1 is a schematic view of an automatic telecommunication toll switching system according to the invention;

FIGS. 2 to 6 arranged as indicated in FIG. 8 represent the parts LAC1, CS1, M11, RE1–42 and CM1 of FIG. 1 in more detail;

FIG. 7 shows a detail of FIG. 4;

FIG. 8 indicates how FIGS. 2 to 6 must be assembled.

Principally referring to FIG. 1 the automatic telecommunication toll switching system shown therein includes 8 identical switching network parts P1 to P8, only one of which P1 is shown in detail. This network part P1 includes six crossbar switches CS1 to CS6 each with 7 vertical operate bars V11–V17 to V61–V67 respectively and with 28 horizontal select bars H11–H128 to H61–H628. The crosspoints of each of the 7 × 6 columns of the seven crossbar switches CS1 to CS6 are multipled and each such column is controlled by a respective one of the vertical operate bars V11 to V67. The crosspoints of the 22 × 6 rows which are each controlled by a respective one of the 22 × 6 horizontal select bars H11–H122 to H61–H622 of the crossbar switches CS1 to CS6 are multipled per row and give access to the incoming junctors IJ11–IJ122 to IJ61–IJ622 respectively. The crosspoints of the 6 × 6 remaining rows which are each controlled by a respective one of the 6 × 6 horizontal select bars H123–H128 to H623–H628 of the crossbar switches CS1 to CS6 are not multipled per row, but the homologous ones of these crosspoints are multipled. Each group of six thus multipled homologous crosspoints has access to a same register among 42 registers RE1 to RE42. For instance the first crosspoints of the crossbar switches CS1 to CS6 controlled by the horizontal select bars H123 to H623 are multipled and give access to register RE1. Switching network part P1 further includes six switch control circuits hereinafter called link access circuits LAC1 to LAC6 each associated to a respective one of the switches CS1 to CS6.

Each of the above switching network parts P1 to P8 is controlled by two markers M11, M12 to M81, M82 which have each access to two common markers CM1 to CM2. The markers M11 to M82 each include a link access selection matrix LASM11 to LASM82, while each of the common markers CM1 and CM2 includes a marker selection matrix MSM1, MSM2, a vertical bar selection matrix VSM1, VSM1 and a horizontal bar selection matrix HSM2. These selection matrices are all of the type described in the above mentioned copending Dutch patent application of even date and entitled "Selection circuit" (S.SIMON — H.VERHILLE 28–7).

From the above it follows that all the incoming junctors of for instance switching network part P1 have access to all the registers RE1 to RE42. More particularly, the incoming junctors connected to the crossbar switches CS1 to CS6 of this part P1 have access to the seven groups of registers RE1 to RE6, . . . ,RE37–RE42 each time under the control of a respective one of the seven vertical bars of the corresponding crossbar switch CS1–CS6.

Likewise the incoming junctors of each of the switching network parts P2 to P8 have access to a corresponding group of 42 registers, there being in total 168 registers instead of 336 since each subgroup of six registers is common to two switching network parts. In the following table it is shown to which subgroups of registers the first, second, . . . , seventh homologous vertical multiples each controlled by a vertical bar have access in each of the switching network parts P1 to P8. There are seven groups each of six homologous vertical multiples per switching network part and hence seven groups each of 48 homologous vertical multiples in total.

RE43–48, . . . , RE127–132 respectively.

This table is obtained as follows: eight subgroups SG1 to SG8 are distributed twice over the eight switching network parts P1 to P8 with a vertical shift of one subgroup in order that, considering only the eight subgroups SG1/8, any pair of network parts P1/8 has at most one subgroup in common. Thus the first and second subgroup columns of the table are obtained;

- eight following subgroups SG9 to SG16 are distributed twice over the switching network eight parts P1 to P8 with a vertical shift of two subgroups in order that considering only the 16 subgroups SG1/16, any pair of the network parts P1/8 has at most one subgroup in common. Thus the third and fourth columns of the table are obtained;
- eight following subgroups SG17 to SG24 are distributed twice over the eight switching network parts P1 to P8 with a vertical shift of three subgroups again in order that, considering the 24 subgroups SG1/24, any pair of the network parts P1/8 has at most one subgroup in common. Thus the fifth and sixth columns of the table are obtained;
- 4 following subgroups SG25 to SG28 are distributed twice over the switching network parts P1 to P8 with a vertical shift of four subgroups for the same reason. Thus the seventh column of the table is obtained.

In this way each switching network part only has one subgroup of registers in common with any of the other switching network parts. This has the advantage that

| Switching network parts | Vertical bars | | | | | | |
|---|---|---|---|---|---|---|---|
| | First | Second | Third | Fourth | Fifth | Sixth | Seventh |
| P1 | RE1-6 | RE7-12 | RE13-18 | RE19-24 | RE25-30 | RE31-36 | RE37-42 |
| P2 | RE43-48 | RE1-6 | RE49-54 | RE55-60 | RE61-66 | RE67-72 | RE73-78 |
| P3 | RE79-84 | RE43-48 | RE85-90 | RE13-18 | RE91-96 | RE97-102 | RE103-108 |
| P4 | RE109-114 | RE79-84 | RE115-120 | RE49-54 | RE121-126 | RE25-30 | RE127-132 |
| P5 | RE133-138 | RE109-114 | RE139-144 | RE85-90 | RE145-150 | RE61-66 | RE37-42 |
| P6 | RE151-156 | RE133-138 | RE157-162 | RE115-120 | RE31-36 | RE91-96 | RE73-78 |
| P7 | RE163-168 | RE151-156 | RE19-24 | RE139-144 | RE67-72 | RE121-126 | RE103-108 |
| P8 | RE7-12 | RE163-168 | RE55-60 | RE157-162 | RE97-102 | RE145-150 | RE127-132 |

From the table it follows that each subgroup of 6 registers may be reached in two switching network parts. For instance the subgroups of registers Re1–RE6 and RE37–RE42 may be reached in the switching network parts P1, P2 and P1, P5 respectively. This is schematically indicated in FIG. 1 by the terminals P2 and P5. Since in each switching network part each subgroup of 6 registers may be reached via each of the 6 crossbar switches included in this part, it is clear that each such subgroup may be reached via 12 crossbar switches in total. For instance the subgroups of registers RE1–RE6 and RE37–RE42 may be reached via 12 crossbar switches of the switching network parts P1, P2 and P1, P5 respectively. For this reason the conductors 1*p* and 7*p* issuing from these subgroups and shown on FIG. 5 each carry a multiple arrow 12.

The above table may be replaced by the following one:

| Switching Network parts | Subgroup columns | | | | | | |
|---|---|---|---|---|---|---|---|
| P1 | SG1 | SG8 | SG9 | SG15 | SG17 | SG 22 | SG25 |
| P2 | SG2 | SG1 | SG10 | SG16 | SG18 | SG 23 | SG26 |
| P3 | SG3 | SG2 | SG11 | SG 9 | SG19 | SG 24 | SG27 |
| P4 | SG4 | SG3 | SG12 | SG10 | SG20 | SG 17 | SG28 |
| P5 | SG5 | SG4 | SG13 | SG11 | SG21 | SG 18 | SG25 |
| P6 | SG6 | SG5 | SG14 | SG12 | SG22 | SG 19 | SG26 |
| P7 | SG7 | SG6 | SG15 | SG13 | SG23 | SG 20 | SG27 |
| P8 | SG8 | SG7 | SG16 | SG14 | SG24 | SG 21 | SG28 |

wherein the subgroups of registers SG1, SG2, . . . , SG28 obviously correspond to the subgroups RE1–6, when an incoming junctor of two such switching network parts simultaneously call for being connected to a register of a respective one of the groups of registers associated of these parts, the risk that a same register will be selected for being connected to these incoming junctors is very small, as will be explained later.

Another advantage of the above scheme is that it permits to have as much as 13 subgroups of registers, or 13 × 6 registers working for each pair of network parts, i.e. 39 registers per network part, 39 being a high percentage, as compared to the 42 assigned to each such part.

It is clear that if one likes to use each subgroup three or more times, while maintaining the advantage of using it only once for each switching network part, it is sufficient to form each time the corresponding number of columns, i.e. three or more instead of two as in the above example. with a suitable shift between these columns.

In brief, the above described circuitry operates as follows.

When one or more of the incoming junctors connected to one of the crossbar switches in one of the switching network parts calls or call for being connected to a register of the set of registers to which this crossbar switch has access, this call or these calls are transmitted to and registered in common in the link access circuit associated to this crossbar switch on condition that at least one of the vertical bars of this switch and at least one register of the group of registers associated to this vertical bar are available. Each link access circuit which has thus received a call from one or more of the incoming junctors connected to the crossbar switch to which this link access circuit is associated in its turn requests for the intervention of one of the two markers such as M11, M12, M81, M82 associated to the switching network part to which the link access circuit belongs. By means of the link access selection matrix such as LASM11, LASM12 included therein, each of these two markers subsequently selects one of the six possible requesting link access circuits such as LAC-1–LAC6. This marker is then connected to the selected link access circuit. It subsequently selects one of the calling incoming junctors and operates in the selected link access circuit the horizontal select bar giving access to the selected incoming junctor. Since only two markers are associated to a group of six link access circuits, it is clear that at most two requests for a marker can be granted simultaneously. This means that in total 16 markers may be operated simultaneously. The markers having thus granted a call issued from a link access circuit subsequently request for the intervention of one of two common markers CM1 and CM2. By means of the marker selection matrix MSM1, MSM2 included therein each of the latter common markers selects one of the 16 possible requesting markers M11, M12 to M81, M82. This common marker is then connected to the marker selected. By means of the vertical bar selection matrix VSM1, VSM2 it subsequently selects a free vertical operate bar in the crossbar switch to which the selected link access circuit is associated, on condition that in this crossbar switch such a free vertical bar and at least one free register in the group of registers coupled to the crosspoints controlled by this vertical bar are available. When such a vertical bar has been selected the common marker Cm1, Cm2 by means of the horizontal selection matrix HSM1, HSM2 included therein then selects a horizontal select bar such as H123–H128, H623–H628 controlling the crosspoint coupled to a free register in the last mentioned group. After having received the identities of the selected horizontal and vertical bars from the common marker the marker connected thereat subsequently operates the selected horizontal and vertical bars in the crossbar switch associated to the selected link access circuit due to which the calling incoming junctor and the selected free register are interconnected.

For instance, when the incoming junctor IJ11 connected to crossbar switch CS1 calls for being connected to one of the registers RE1 to RE42, this call is transmitted to and registered in the link access circuit LAC1 on condition that at least one of the vertical operate bars V11 to V17 of this switch and at least one of the registers coupled to the crosspoints controlled by this vertical bar are available. The link access circuit LAC1 then in its turn requests for the intervention of one of the two markers M11 and M12 and marker M11 for instance selects the link access circuit LAC1 by means of the link access matrix LASM11. This marker is then connected to this link access circuit LAC1. It selects the calling incoming junctor IJ11 and operates in the selected link access circuit LAC1 the horizontal select bar H11 giving access to the incoming junctor IJ11. The marker M11 also requests for the intervention of one of the common markers CM1 and CM2.

For instance common marker CM1 selects marker M11 by means of the marker selection matrix MSN1. By means of the vertical bar selection matrix VSMI included therein this marker then selects a free vertical operate bar, e.g. V11 in the crossbar switch CS1 on condition that such a free vertical bar and at least a free register in the group of registers RE1–RE6 coupled to the crosspoints controlled by this vertical bar V11 are available. After the selection of this vertical bar the common marker CM1 then selects a horizontal select bar, e.g. H123, giving access to a free register e.g. RE1 in the last mentioned group by means of the horizontal selection matrix HSM1. After having received the identities H123 and V11 from the associated common marker CM1 the marker M11 subsequently operates these horizontal select and vertical operate bars in the associated link access circuit LAC1 due to which the calling incoming junctor IJ11 and the free register RE1 are interconnected. It should be noted that in the FIGS. 2 to 7 each of the relays is indicated by a capital character followed by one or two small characters or digits the last character being always r. The contacts of this relay are indicated by the same characters and digits as the relay followed by 1, 2 etc., these characters being however small and r being omitted. For instance relay *Mgr* has contacts such as *mg*1, *mg*2, etc.; relay E*l*1*r* has contacts *el*11, *el*12, etc. The electromagnets are indicated by two capital characters followed by the same digits as the bars they control. For instance electromagnet EV11 controls vertical bar V11, electromagnet EH11 controls horizontal bar EH11, etc. The contacts of these electromagnets are indicated by the same characters and digits as the electromagnet followed by 1,2, etc., these characters being however small. For instance electromagnet EV11 has contacts such as *ev*111, *ev*112, etc. The conductors interconnecting the various circuits, such as LAC1, M11, CM1, RE1–40 are indicated by 1*a*, 2*a*, . . . , 1*b*, 2*b*, . . . etc. The incoming junctors IJ11 to IJ122 are connected to the link access circuit LAC1 by the conductors 1*l*, 1*m* to 22*l*, 22*m*. The link access circuit LAC1 is connected to the markers M11 and M12 via the conductors 1*a* – 6*a*, 1*b* – 88*b*, 1*c* – 29*c* and 1*d* – 16*d*, and to the registers RE1 – RE42 via the conductors 1*n* – 7*n* and 1*r* – 42*r*. More particularly the conductors 1n to 7n are each connected to a respective one of the conductors 1*p* to seven*p* leading to a respective one of the seven groups of registers RE1–RE6 to RE37–RE42, the registers of each of these groups being coupled to the crosspoints controlled by a respective one of the vertical bars V11 to V17 of the crossbar switch CS1 included in the LAC1. The marker M11 is connected to the common markers CM1 and CM2 via the conductors 1*e* – 8*e*, 1*f* – 27*f* and 1*g* – 38*g* and to the registers RE1 – RE42 via the conductors 1*k* – 42*k* and 1*h* – 7*h*. More particularly the conductors 1*h* and 7*h* are each connected to a respective one of the seven groups of registers RE1–REG to RE37–RE42. The markers M12 and CM2 are identical to M11 and CM1 respectively and have therefore not been shown. As already mentioned above, the selection matrices LASM11, MSM1, VSM1 and HSM1, are all of the type disclosed in the above mentioned patent application. More particularly:

- the LASM11 (FIG. 4) only differs from the described selection matrix by the absence of the inhibiting row wire *rw*7 and associated contact am and diodes D7 and D81 to D86;
- the MSM1 (FIG. 6) distinguishes from the LASM11 in that it includes groups of 16 terminals instead of groups of six terminals, i.e. X1–X16, Y1–Y16, Z1–Z16, U1–U16, W1–W16, Q1–Q16, due to the fact that the common marker CM1 may be connected to 16 markers M11, M12 to M81; M82.

Moreover, this matrix does not include a preference circuit. The elements connected to these terminals have been indicated by references which are different from those used in the LASM11, e.g. U1r–U16r, u11 –u161, u12–u162, D101–D1016, D111–D1116, D231–D2316;

the VSM1 (FIG. 6) distinguishes over the LASM11 in that it includes groups of seven terminals, i.e. X1–X7 and Y1–Y7 since there are seven vertical bars per crossbar switch, and that the terminals Z1–Z7, U1–U7, V1–V7 and W1–W7 are not used and therefore not shown. Moreover, the terminals Y1–Y7 are connected to the relays V1r–V7r and the contact am is a change-over contact. The make contact of this contact am is connected to a respective one of the relays V1r–V72 via the series connection of a diode D24 and a make contact v11–v71 of this relay;

the HSM1 (FIG. 6) distinguishes over the VSM1 in that it includes groups of six terminals, i.e. X1–X6 and Y1–Y6, since there are six terminals per crossbar switch, and that the terminals Y1–Y6 are connected to the relays H1r–H6r. Moreover, the make contact of the contact am is connected to a respective one of the relays H1r–H6r via the series connection of a diode D25 and a make contact h11-h61 of this relay. The diodes D4 and D25 serve for decoupling the relays V1r–V7r and H1r–H6r from each other.

Principally referring to FIGS. 2 to 7 the above briefly described example will now be described in detail.

When the incoming junctor IJ11 connected to crossbar switch CS1 makes a call for being connected to one of the registers RE1 to RE42, make contact c1 of a not shown call relay Cr is closed due to which the following circuit is established for the call registering relay Ear in the link access circuit LAC1: battery in the LAC1, winding of relay Ear, diode rectifier D221, conductor 1m to IJ1, contact cl in the IJ11, other not shown closed contacts, represented by dots, contact f1, in the LAC1, a parallel circuit with seven branches each constituted by the series connection of a respective diode rectifier D131–D137, a respective break contact ev1-11–ev171 of a respective electromagnet EV11–EV71 controlling a respective vertical bar V11–V17 of the cross-bar switch CS1, a respective conductor 1n–7n, a respective conductor 1p–7p, and a parallel circuit with six branches each including not shown closed contacts represented by dots and a respective break contact bf11–bf16 to bf137–bf142 indicating the busy/free condition of the registers RE1-RE6 to RE37–RE42 coupled to the crosspoints controlled by the vertical operate bars V11 to V17 of the crossbar switch CS1.

It is clear that relay Ear is energized only when simultaneously at least one of the vertical bars V11 to V17 is not operated, i.e. when at least one of the contacts ev111 to ev171 is closed, and at least one register in the corresponding group of registers RE1–RE6 to RE3-7–RE42 is free, i.e. when a contact is closed in at least one of the corresponding groups of contacts bf11–bf16 to bf137–bf142.

The operated relay Ear registers the fact that at least one call for a register has been made by one of the incoming junctors IJ11 to IJ122 and changes the position of its contacts ea1 to ea25:

by the closure of contacts ea1 to ea22 a connection is prepared between the winding of relay Ear in the LAC1 and each of the windings of the relays A1r to A22r in each of the markers M11 and M12, via a respective diode rectifier D221–D2222, a respective contact ea1–ea22 and a respective conductor 1b–22b. It should be noted that a plurality of these conductors 1b–22b may be grounded since a plurality of incoming junctors IJ11 to IJ122 may be in the calling condition;

by the closure of contact ea23 a starting battery of the LAC1 is connected to the input X1 of the link access selection matrices LASM11 and LASM12 included in the markers M11 and M2 via resistance R31, contact ea23, contact st2, st3 and conductor 1a, 2a respectively. Thus the LAC1 requests for the intervention of one of the markers M11, M12. The other inputs X2–X6 of these link access selection matrices such as LASM1 of the M11 are connected to the respective link access circuits LAC2 (not shown)

LAC6, of the switching network part P1, which may also request for the intervention of this marker M11. It is supposed that as a consequence of the above battery having been connected to input X1 of the LASM11 relay L1r is energized in the marker M11, thus indicating that this marker M11 has selected the calling LAC1.

It should be noted that as soon as the LASM11 of the marker M11 has made conductive the transistor (not shown) leading to the relay L1r, the corresponding transistor in the LASM12 of the other marker M12 is prevented from being operated due to terminal Q1 of LASM11 being connected to terminal V1 of the LASM12. Consequently the marker M12 is prevented from also selecting the calling LAC1.

In the marker M11 the energized relay L1r changes the position of its contacts l11 and l12:

contact l11 applies a ground to terminal Z1 of the LASM11 via diode D41 due to which the other relays L2r to L6r (not shown) included in this matrix are prevented from being operated, and to the left hand winding of relay Mgr via diode D51 due to which the latter relay Mgr is energized. The operated relay Mgr indicates the effective seizure of the marker M11;

contact l12 prepares the connection of a ground to the left hand winding of relay El1r in the LAC1.

The energized relay Mgr in the M11 changes the position of its contacts mg1 to mg11:

by the closure of contact mg1 relay El1r in the LAC1 is operated between ground and battery via contacts mg1 and l12, conductor 3a and its left hand winding. Simultaneously a blocking ground is applied to the terminals U2–U6 of the LASM11 via contacts mg1 and 122–162 and diodes D62–D66. The latter blocking ground prevents a renewed operation of the LASM1. The energized relay El1r in the LAC1 indicates to the LAC1 that it has been selected by the marker M11;

by the closure of contact mg2 relay Mcr in the M11 is energized between ground and battery via contacts mg2, me1 and md1;

by the closure of contact mg3 relay Mlr in the M11 is operated between ground and battery through contact mg3 and its left hand winding. Relay Mlr is the last relay to release in the marker M11;

by the closure of contact mg4 a locking circuit is prepared for the relays Mgr and El1r;

by the closure of contact *mg*5 a locking circuit is prepared for relay M*fr;* by the closure of contact *mg*6 a locking circuit is prepared for relay M*dr;* by the closure of contact *mg*7 a locking circuit is prepared for relay D*pr* forming part of a double test circuit by the closure of contact *mg*8 a potentiometer constituted by the resistances R101 and R111 is connected to the right hand winding of relay D*gr* also forming part of the double test circuit;

by the closure of contact mg9 a locking circuit is prepared for the relays V*h*1*r*–V*h*7*r* and H*h*1*r*–H*h*6*r;* by the closure of contacts *mg*10 and *mg*11 a battery is connected to the input X1 of the 16 inputs X1 to X16 of each of the marker selection matrices MSM1 and MSM2 in the respective common markers CM1 and CM2 via resistance R61 and contacts *mg*10, *hm*1 and resistance R61 and contacts *mg*11, *hm*2 respectively. Thus the M11 in its turn requests for the intervention of one of the common markers CM1 and CM2. The other inputs X2–X16 of these MSM1 are connected to the 15 other markers such as M12, M81, M82 which may also request for the intervention of the common markers. As a consequence of the above battery being connected to input X1 of the MSM1 relay U1r is supposed to be energized in the CM1, thus indicating that the common marker CM1 has selected the requested marker M11.

It should be noted that as soon as the MSM1 of the common marker CM1 has operated the transistor (not shown) leading to relay U1*r*, the corresponding transistor in the MSM12 of the other common marker CM2 is prevented from being operated due to terminal Q1 of the MSM1 being connected to terminal V1 of the MSM1. Consequently the common marker CM2 is preventing from also selecting the marker M11.

The energized relay E*l*1*r* in the LAC1 changes the positions of its contacts *el*11 to *el*168. Hereby it should be noted that in practice instead of a single relay E*l*1*r* a plurality of relays are operated in parallel in order to obtain the high number of 68 contacts.

by the closure of contact *el*11 a locking circuit for the relays E*l*1*r* and M*gr* is further prepared;

by the closure of contacts *el*12 to *el*167 the LAC1 is connected to the M11 via a plurality of conductors:

closed contacts *el*12–*el*123 connect contacts *ea*1—*ea*22 of the LAC1 to the respective conductors *ib*–22*b* leading to the winding of the relays A1*r*–A22*r* in the M11;

closed contacts *el*124–*el*145 connect the windings of the electromagnets EH11 to EH122 controlling the horizontal select bars H11–H122 of the crossbar switch CS1 to the respective conductors 45*b*–66*b* leading to the contacts *a*13 to *a*223 in the M11;

closed contacts *el*146–*el*152 connect the contacts *ev*112–*ev*172 of the electromagnets EV11–EV17 controlling the vertical operate bars V11–V17 of the crossbar switch CS1 to the respective conductors 1*c*–7*c* leading to the contacts *ms*3–*ms*9 and *ns*3–*ns*9 and to the conductors 1*h*–7*h;* closed contact *el*153 connects the contacts *eh*12-31–*eh*1281 of the electromagnets EH123—EH128 controlling the horizontal bars H123–H128 of the crossbar switch CS1 to the conductor 15*c* leading to contact *dp*2 in M11;

closed contacts *el*154–*el*159 connect the windings of the electromagnets EH123–EH128 to the respective conductors 17*c*–23*c* leading to the contacts *hh*13–*hh*63 in the M11;

closed contacts *el*160–*el*166 connect the windings of the electromagnets EV11–EV17 controlling the vertical operate bars V11–V17 of the crossbar switch CS1 to the respective conductors 1*d*–7*d* leading to the contacts *vh*13–*vh*73 in the M11; closed contact *el*167 connects ground to conductor 15*d* leading to contact *m*11 in the M11;

closed contact *el*168 prepares a locking circuit for relay S*tr*.

The energized relay M*cr* in the M11 changes the position of its contacts *mc*1 to *mc*23:

contacts *mc*1 to *mc*22 establish operation circuits for the relays A1*r* to A22*r*. Due to this relay A1*r* is energized in the following circuit:

ground in the register RE1, contact *bf*11, conductor 1*p* to the LAC1, conductor 1*n* in the LAC1, contact *ev*111, diode rectifier D131, contacts *f*1, . . . , *c*1 in the IJ11, conductor 1*m*, contacts *ea*1 and *el*12 in the LAC1, conductor 1*b* to the M11, winding of relay A1*r*, contacts *mc*1 and *md*4, battery. The energized relay A1*r* indicates that the M11 has selected the calling incoming junctor IJ11. It should be noted that if the relays A1*r* to A22*r* are associated to the incoming junctors IJ11–IJ61 to IJ122–IJ622 respectively so that if for instance the M11 would have granted the call of incoming junctor IJ61 the same relay A1*r* would have been energized;

contact *mc*23 removes ground from contact *me*2 and this prevents the operation of the check circuit constituted by contacts *a*13–*a*223 and *a*14–*a*224.

The operated relay M*lr* in the M11 changes the position of its contacts *ml*1 to *ml*3;

by the closure of contact *ml*1 relay M*lr* is locked in the following circuit: ground in the LAC1, contact *el*167, conductor 15*d* to the M11, contact *ml*1, right hand winding of relay M*lr*, battery;

by the closure of contact *ml*2 a further locking circuit is prepared for relay M*lr;* by the closure of contact *m*13 contact *mg*1 is shunted so that even when relay M*gr* is released a ground will be present on the terminals U2–U6 when relay L1*r* is in the operative condition or on the terminals U1–U6 when relay L1*r* is in the released condition. In other words, as long as relay M1*r* is energized the LASM11 is blocked so that the marker M11 cannot be seized again. This is clearly explained in the above mentioned copending Dutch patent application of even date;

The energized relay U1*r* in the CM1 changes the position of its contact *u*11 and *u*12:

by the closure of contact *u*11 a ground is applied to the terminal *z*1 of the MSM1 via diode D101 due to which the other relays U2*r* to U6*r* included in this matrix are prevented from being operated, and to the right hand winding of relay X*r* via diode D111 due to which the latter relay X*r* is energized. The operated relay X*r* indicates the effective seizure of the common marker circuit CM1;

by the change of position of contact *u*12 the connection of a ground to relay M*sr* in the M11 is prepared.

The energized relay A1*r* in the M11 changes the position of its contacts *a*11 to *a*14:

by the closure of contact *a*11 relay A1*r* is locked since contact *a*1 shunts contact *mc*1;

by the closure of contact *a*12 relay Mer is energized. The operated relay Mer indicates in the M11 that a calling incoming junctor has been selected;

by the closure of contacts *a*13 and *a*14 an operation circuit is prepared in the M11 for the electromagnet EH11 in the LAC1.

The energized relay X*r* in the CM1 changes the position of its contacts *x*1 and *x*2;

by the closure of contact *x*1 relay M*sr* in the M11 is energized between ground and battery via contacts *x*1 and *u*12, conductor 4*e*, winding of relay M*sr* and a blocking ground is applied to the terminals U2–U16 of the MSM1 via contacts *x*1 and *u*2-2–*u*162 and diodes D222 (not shown)–D2216. The latter blocking ground prevents a renewed operation of the MSM1. The operated relay M*sr* indicates to the M11 that it has been selected by the common marker CM1;

by the closure of contact *x*2 a locking circuit is prepared for relay X*r*.

The operated relay M*er* in the M11 changes the position of its contacts *me*1 to *me*4:

by the opening of contact *me*1 relay M*cr* is released;

by the closure of contact *me*2 the above mentioned operating circuit for electromagnet EH11 is further prepared;

the closure of contact *me*3 relay Mgr in the M11 is locked in series with relay E*l*1*r* in the LAC1 in the following circuit: ground, right hand winding of relay M*gr*, contacts *mg*4, *me*3 and *el*11, right hand winding of relay E*l*1r, battery;

by the closure of contact *me*4 relay M*dr* is operated;

by the closure of contact *me*5 the contact *md*4 is shunted in the operating circuit of relay A1*r* which is thus locked.

The released relay M*cr* in the M11 changes the position of its contacts *mc*1 to *mc*23:

the open contacts *mc*1 to *mc*22 open the operation circuits of the relays A1*r* to A22*r;* the closed contact *mc*23 energizes the electromagnet EH11 in the LAC1 in the following circuit: ground in the M11, contacts *mc*23, *me*2, *a*224, *a*223 to *a*23 (not shown), *a*14, *a*13, conductor 45*b* to the LAC1, contact *el*124, winding of electromagnet EH11, battery. It should be noted that the circuit constituted by the contacts *a*–*a*223 and *a*14–*a*224 is a check circuit which checks that one and only one of the relays A1*r*–A22*r* has been energized.

The energized electromagnet EH11 in the LAC1 operates the associated horizontal select bar H11 in the crossbar switch CS1 and changes the position of its contacts *eh*111 and *eh*12;

by the closure of contact *eh*111 relay E*er* in the LAC1 is operated thus indicating that a horizontal bar of the crossbar switch CS1 has been operated;

by the closure of contact *eh*112 the operation of relay Mfr in the marker M11 is prepared;

The energized relay M*dr* in the M11 changes the position of its contacts *md*1 to *md*4:

by the opening of contact *md*1 the operating circuit of relay Mcr is further opened. Due to this the relay Mcr cannot be operated again even if the relays M*er* and M*gr* are released and operated respectively;

by the closure of contact *md*2 relay Mdr is locked via contacts *mg*6 and *md*2;

by the closure of contact *md*3 relay M1*r* is locked via contacts *md*3, *ml*2 and the left hand winding of this relay;

by the opening of contact *md*4 nothing happens since contact *me*5 is in the closed position and thus maintains relay A1*r* energized.

The energized relay E*er* in the LAC1 changes the position of its contacts *ee*1 and *ee*2:

by the closure of contact *ee*1 a ground is connected in the LAC1 to contact f1 in the IJ . In this manner the condition of the relays Ear in the LAC1 and A1*r* in the M11 is independent from the condition of the contacts *bf*1 to *bf*42 in the registers RE1 to RE42.

by the closure of contact *ee*2 relay Str is energized in the LAC1.

The operated relay S*tr* changes the position of its contacts *st*1, *st*2 and *st*3:

by the closure of contact *st*1 relay S*tr* is locked via contacts *el*168 and *st*1;

by the opening of contact *st*2 the starting battery is removed from terminal X1 of the LASM11 of the M11 so that relay L1*r* is released. By the opening of contact *l*11 the ground is removed from terminal *z*1 and from the left hand winding of relay M*gr*, but the LASM11 is still blocked since a ground is still connected to the terminals U1–U via contacts *mg*1, *ml*3 and *l*12. This is clearly described in the above mentioned copending patent application of even date;

the opening of contact *st*3 has no effect.

The energized relay M*sr* which indicates that the marker M11 has been effectively seized by the common marker CM1 changes the position of its contacts *ms*1 to *ms*35. Again it should be noted that in practice a plurality of relays are used instead of relay M*sr* in order to obtain the required high number of contacts:

by the closure of contact ms1 relay X*r* in the CM is locked via contact *ms*1, conductor 5*e*, contact x2 and the left had winding of relay X*r;* by the closure of contact ms2 relay Amr in the CM1 is energized via this contact and conductor 7*e;* by the closure of contacts *ms*3 to *ms*9 the conductors 1*f*to 7*f* leading to the respective inputs X1 to X7 of the vertical bar selection matrix VSM1 in the CM1 are connected via resistance R71–R77 to the conductors 1*h*–7*h* leading to a respective subgroup of registers RE1–RE6, . . . , RE37–RE42 where each of these conductors is coupled to battery, via a resistance R81–R86, . . . , R837–R842 and contact *bf*21–*bf*26, . . . , *bf*237–*bf*242 indicating the busy/-free condition of the corresponding register. Hereby the resistances of each of the subgroups of registers are connected in parallel. From the above it follows that a battery is applied to the conductors 1*h*–7*h* if in the corresponding one of the subgroups of registers RE1–RE6 to RE37–RE42 at least one register is free. As already mentioned above, the junction point of each of the conductors 1*h*–7*h* and each of the corresponding contacts *ms*3–*ms*9 is connected to a respective one of the conductors 1*c*–7*c* which each are connected to a ground in the LAC1 via a respective contact *el*146 –*el*152 and a respective contact *ev*112–*ev*172. Since the contacts *ev*112–*ev*172 are contacts of the electromagnets EV11–EV17 controlling the respective vertical operate bars V11–V17, it is clear that a battery present on a conductor 1*h*–7*h* due to register being free in the corresponding subgroup will be applied to the inputs X1–X7 of the VSM1 only and only if the corresponding vertical operate bar V11–V17 has not yet been operated. It is supposed that all the vertical operate bars V11 to V17 are available and that all the registers RE1 to RE42 are free. Due to this batteries are applied to the inputs X1 to X7 of the matrix VSM1, which is however, prevented from being operated as long as relay A*mr* is in the released condition;

by the closure of contacts *ms*10 to *ms*16 a ground is applied to each of the conductors 1*i*–7*i* via a respective contact *v*12 –*v*72 and a respective contact *ms*10–*ms*16. Each of these conductors 1*i* to 7*i* is connected to battery (FIG. 7) via a parallel circuit including six branches each constituted by the series connection of a decoupling diode rectifier D201–D206 to D2037–D2042, resistance R121–R126 to R1237–R1242, conductor 1*k*–6*k* to 37*k*–42*k*, a resistance R91–R96 to R937–R942, and a contact *bf*31–*bf*36 to *bf*337–*bf*342 indicating the busy/free condition of the registers RE1–RE6 to RE37–RE42;

by the closure of contacts *ms*17–*ms*23 the relays V*h*1*r*–V*h*7*r* are each connected to a respective one of the conductors 1*g*–7*g* leading to a respective contact *v*12–*v*72 in the CM1;

by the closure of contacts *ms*24–*ms*29 the inputs X1–X6 of the horizontal bar selection matrix HSM1 of the CM1 are each connected to a respective one of the conductors 1*j*–6*j*. Each of these conductors 1*j* to 6*j* is connected to the cathodes of seven diode rectifiers D201–D2037 to D206–D2042 via a respective decoupling diode rectifier D211–D2137 to D216–D2142. Each of the conductors 1*j* to 7*j* is hence connected to battery via a parallel circuit including 7 branches each constituted by the series connection of a decoupling diode rectifier D211–D216 to D2137–D2142, resistance R121–R1237 to R126–R1242, conductor 1*k*–37*k* to 6*k*–42*k*, resistance R91–R937 to R96–R942 and a contact *bf*31–*bf*37 to *bf*36–*bf*342 indicating the busy/free condition of the registers RE1–RE37 to RE6—RE42;

by the closure of contacts *ms*30–*ms*35 the relays H*h*12–H*h*6*r* are each connected to a respective one of the conductors 27*g*–32*g* leading to a corresponding contact *h*12–*h*62 in the CM1.

The energized relay Amr change the position of its change-over contact *am*1 due to which the VSM1 can be operated and a locking circuit is prepared for the relaysV1*r*–V7*r* of the VSM1 and H1*r*–H6*r* of the HSM1. It is supposed that as a consequence thereof relay V1*r* is energized, this indicating that the vertical operate bar V11 is selected due to the fact that this bar has not yet been operated and that at least one register of the group of registers RE1–RE6 is free.

The energized relay V1*r* in the VSM1 changes the position of its contacts *v*11 and *v*12:

by the closure of contact *v*11 relay V1*r* is locked between ground and battery via contact *am*, diode D24, contact *v*11 and the winding of relay V1*r*, thus the relay V1*r* is maintained energized independently from the potential on the point X1 which lead to its operation;

by the change of position of contact *v*12 relay Vh1*r* in the M11 is energized between ground and battery via contact *v*12, conductor 1*g*, contact *ms*17 and winding of relay V*h*1*r*. The energized relay Vh1r indicates to the M11 that the CM1 has selected the vertical bar V11. By the change of position of contact *v*12 the ground is also removed from conductors 15*f* and 1*i* so that the batteries from the registers RE1to RE6 are now connected to the respective inputs X1–X6 of the HSM1 via the conductors 1*k*–6*k* and 1*j*–6*j* if these registers are free as is supposed i.e. if the corresponding contact *bf*31–*b*37 is closed. As a consequence of the above for instance relay H1*r* in the HSM1 is energized. The operated relay H1*r* indicates that the horizontal bar H123 has been selected. It should be noted that the batteries from registers RE7–RE42 can have no effect since the conductors 2*i*–6*i* are grounded via contacts *v*22–*v*72.

The operated relay V*h*1*r* in the M11 changes the position of its contacts *vh*11 to *vh*19:

by closure of contact *vh*11 relay V*h*1*r* is locked via contact *mg*9, diode rectifier D161 and contact *vh*11;

by the closure of contact *vh*12 the operation of relay H*mr* in the M11 is prepared;

by the closure of contact *vh*13 the connection of a ground to conductor 1*d* leading to the LAC1 is prepared;

by the closure of contacts *vh*14 to *vh*19 the operation of relay D*pr* in the double test circuit is prepared.

The energized relay H*r* in the CM1 changes the position of its contacts *h*11 and *h*12:

by the closure of contact *h*11 relay H1*r* is locked between ground and battery via contact *am*, diode D25, contact *h*11 and the winding of relay H1*r*;

by the closure of contact *h*12 relay H*h*1*r* in the M11 is energized between ground and battery via this contact *h*12, conductor 27*g*, contact *ms*30 and the winding of this relay. The energized relay H*h*1*r* indicates to the M11 that the CM1 has selected the horizontal bar H123.

The operated relay H*h*1*r* changes the position of its contacts *hh*11 to *hh*14:

by the closure of contact *hh*1 relay H*h*1*r* is locked between ground and battery via contact *mg*9, diode D171 and contact hh11;

by the closure of contact *hh*12 the relays Hmr and H*xr* are energized via contact *hh*12, diode D141 and contact *vh*12 and via contact *hh*12 and diode D151 respectively;

by the closure of contact *hh*13 the connection of a ground to conductor 17*c* leading to the LAC1 is prepared;

by the closure of contact *hh*14 one end of the left hand winding of relay D*qr* is connected to the battery provided by the register RE1 via diode D181, contacts *hh*14 and *vh*14, conductor 1*k*, resistance R91 and contact *bf*31. If no other marker is testing or the same register RE1, as is supposed, relay D*qr* is energized due to its right hand (high resistance) winding and its left hand (low resistance) winding being connected in series between the tapping point of potentiometer R101, R111 and the last mentioned battery.

It should be noted that since the two common markers CM1 and CM2 may operate simultaneously and since each register may be reached via two switching network parts each controlled by two markers which are each adapted to co-operate with a common marker, it is clear that these two common markers may simultaneously select this register via two of these four markers. This is the reason why a double test may occur.

It is clear that due to any pair of network parts having only a single subgroup of registers in common the risks of such a double test on a same register of this subgroup are very small.

The energized relay Hmr in the M11 opens its contacts *hm*1 and *hm*2. The opening of contact *hm*2 has no effect but due to the opening of contact *hm*1 the battery is removed from the input X1 of the MSM1 in the CM1. In the MSM1 relay U1*r* is consequently released so that also relay M*sr* in the M11 is released. Due to this the marker is disconnected from the CM1 wherein all the relays X*r*, A*mr*, V1*r*, H1*r* are released. This CM1 is then again available.

The operated relay H*xr* in the M11 closes its contact *hx*1 due to which the electromagnet EH123 controlling the horizontal bar H123 is operated in the LAC1 via contacts *hx*1, *hh*13 and *el*154. The energized electromagnet EH123 closes its contact *eh*1231 due to which a ground is connected to conductor 15*c* via contacts *eh*112, *eh*1231 and *el*153 thus preparing the operation of relay M*fr*. By the closure of contact *eh*1232 of electromagnet EH123 relay Str is further locked.

The energized relay D*qr* closes its contact *dq*1 due to which relay D*pr* is energized and relay D*qr* is locked through this contact *dq*1, diode D191 and its left hand winding which is connected to battery. The energized relay Dpr indicates that the double test has definitively been successful. It should be noted that the double test circuit is known from FIG. 2 of the Dutch Pat. application No. 6,907,015 (E.H. DE RAEDT-S.SIMON 24–25) first-filed in The Netherlands on May 7, 1969 and entitled "Double test circuit".

The operated relay D*pr* in the M11 changes the position of its contacts *dp*1 and *dp*2:

by the closure of contact *dp*1 relay D*pr* is locked via cntacts*mg*7 and *dp*1;

by the closure of contact *dp*2 relay M*fr* in the M11 is energized via the above mentioned ground on conductor 15*c*. This relay thus indicates to the M11 that two horizontal bars have been operated in the link access circuit, here LAC1, connected to it.

The operated relay M*fr* in the M11 changes the position of its contacts *mf*1 to *mf*3:

by the closure of contact *mf*1 relay M*fr* is locked via the series connection of this contact and contact *mg*5;

by the closure of contact *mf*2 the electromagnet EV11 in the LAC1 controlling the vertical bar V11 in the crossbar switch CS1 is energized from ground in the M11 to battery in the LAC1 via contacts *mf*2 and *vh*13, conductor 1*d*, contact el160 and winding of the electromagnet EV11;

by the closure of contact *mf*3 relay M1*r* is further locked.

The energized electromagnet EV11 operates the vertical bar V11 of the CS1 and changes the position of its contacts *ev*111 and *ev*112:

by the opening of contact *ev*111 the ground from the registers RE1–RE6 is removed from the contact *f*1 in the IJ11, but this is without effect since contact *ee*1 has previously been closed;

by the closure of contact *ev*112 a ground is applied to conductor 1c and hence to the conductors 1*f* and 1*h* so that none of the registers of the group RE1–RE6 can be seized again;

by the closure of contact *ev*113 a locking circuit is prepared for the electromagnet EV11.

By the operation of the horizontal bars H11, H123 and of the vertical bar V11 a connection is established between the register RE1 and the incoming junctor IJ11 via the crosspoints indicated by CP1 and CP2. This register RE1 then via contact *re*1 and conductors 1*q* and 1r applies a ground to one of the crosspoint wires, i.e. to the one shown, due to which relay F1*r* is energized in the IJ11 and the electromagnet EV11 is locked via contacts *re*1, crosspoint CP2 and contact *ev*113.

The operated relay F1*r* opens its contact *f*1 thus releasing relay A1*r*. Relay Ear may however remain operated since at least one of the incoming junctors IJ1-1–IJ122 may be in the calling condition. Following the release of relay A1*r* all the operated relays of the M11 and the LAC1 are released, except the electromagnet EV11, the last relay to release in the M11 and in the LAC1 and being the relays M1*r* and S*tr* respectively.

From the above description it follows that the four selection circuits LASM11, MSM11, VSM11 and HSM11 are operated in succession. Indeed, relay Mgr is energized after the operation of the LASM11 and due to this the MSM11 is operated followed by VSM11 and HSM11. It is clear that by using the above selection circuits the establishment of connection between a calling incoming junctor and a free register is established in a rapid way. As already mentioned above this is particularly useful when the described toll telecommunication switching system must be able to co-operate with a direct system.

In this connection it should be noted that it is not necessary to use such a rapidly operating selection circuit for the selection of one of the horizontal bars controlling the crosspoints to which the incoming junctors are connected since this selection circuit operates in parallel with the selection circuits MSM1, VSM1 and HSM1 so that it is sufficient that its operation is finished at the moment the HSM1 has finished its operation. The slower operating selection circuit is therefore built up by means of the relays A1*r* to A22*r*.

It is also clear that due to the selection circuits LASM11 and A1*r*–A22*r* being located in the markers and due to the selection circuits MSM1, VSM1 and HSM1 being located in the common markers, a considerable gain of material is obtained with respect to a switching system wherein one would locate the selection circuits LASM11, A1*r*–A22*r*, VSM1 and HSM1 for instance in the link access circuits.

Hereby it should also be noted that it has been possible to use a small number of common markers for a relatively high number of markers reckoning with a given traffic due to the fact that each common marker is used during only a small time interval. Indeed, each common marker is constituted by three rapidly operating selection circuits MSM1, VSM1, HSM1 which operate in succession, the VSM1 and the HSM1 directly communicating the result of their operation to the marker to which this common marker is connected.

In order to facilitate, understanding the claims, it should be noted that therein:

the link access circuits are called control circuits;

the markers are called first common control means;

the common markers are called second common control means;

the electromagnets controlling the horizontal and vertical bars are called first and second control elements respectively;

the electromagnets EH11–EH122 form a so called first plurality of first control elements, whereas the electromagnets such as EH123–EH128 form a so called second plurality of first control elements;

the LASM11, A1*r*–A22*r*, MSM1 VSM1 and HSM1 are called first, second, third, fourth and fifth selection means respectively;

the incoming junctors and registers are called first and second circuits respectively;

the relay Ear is called first request means;

the contacts *c*1–*c*22 are called second request means;

the relay Mgr is called third request means.

While the principles of the invention have been described above in connection with specific apparatus, it is to be clearly understood that this description is made only by way of example and not as a limitation on the scope of the invention.

What is claimed is:

1. An automatic telecommunication switching system comprising a plurality of switching networks, each switching network including a plurality of switches and a plurality of control circuits with each control circuit being individually associated with a predetermined one of said switches, each control circuit including a first set of control elements and a second set of control elements for providing control for crosspoints of the corresponding switch, first and second common control means, said first common control means connected to each of said switching networks to intervene in the selection of a control element of said first set, and said second common control means to control said first common control means, said second common control means including means to enable temporary connection to said first common control means to intervene in the selection of a control element of said second set.

2. An automatic telecommunication switching system according to claim 1, in which said first common control means includes first selection means to select a single one of said control circuits and second selection means to select in a selected control circuit a single control element of said first set, and said second common control means includes third selection means to seize said first common control means and forth selection means to select in said selected control circuit a single second control element of said second set.

3. An automatic telecommunication switching system according to claim 1 in which said second common control means includes fifth selection means to select in said selected control circuit a single control element among the control elements of said first set.

4. An automatic telecommunication switching system according to claim 1, in which said plurality of control circuits includes a first group of control circuits and a second group of control circuits and said groups are intercoupled by means of switches and a control circuit of said first group is connected to a control circuit of said second group subsequent to the operation in said selected control circuit of said first plurality of a selected first control element of said first set, of a selected single control element of said first set, and of said selected single control element of said second set.

5. An automatic telecommunication switching system according to claim 4, in which in each said control circuit the control elements of said first set are each associated with a distinct one of said circuits of said first group coupled to the switch to which said control circuit is individually associated, the control elements of said second set are each associated to a group of control circuits of a second group coupled to said switch, and the control elements of said second set are each associated to all circuits of said first plurality and to a distinct group of circuits of said second plurality, the latter group including one circuit of each of the sets of second circuits.

6. An automatic telecommunication switching system according to claim 4, in which each of said switches is a crossbar switch the crosspoints of which are arranged in a first plurality of rows, in a second plurality of rows and in a set of columns, the crosspoints of each row of said first plurality being multiplied and each such row being connected to a distinct one of said control circuits of said first group, the corsspoints of each row of said second plurality being each connected to a distinct one of said control circuits of said second group and the crosspoints of each column being multiplied, and that said control elements of said first and second set included in the control circuit associated with said switch control the operation of the select and operate bars of the switch, these bars in their turn controlling the crosspoints of the said rows and columns of crosspoints.

7. An automatic telecommunication switching system according to claim 6, in which homologous crosspoints of the second plurality of rows of said switches are multiplied.

8. An automatic telecommunication switching system according to claim 4, in which the switches are duplicated in each of a plurality of groups of switches to provide full access between a control circuit of said first group and a control circuit of said second group and that the sets of the pair of sets of second circuits to which the groups of switches of any pair have access respectively, include a minimum number of second circuits in common.

9. A automatic telecommunication switching system according to claim 8, in which all said said pairs of sets of second circuits have different control circuits of said second group in common.

10. An automatic telecommunication switching system according to claim 9, in which each control circuit of said second group includes a plurality of subgroups of circuits, each subgroup includes at least one circuit of said second group, and the subgroups of second circuits of said sets to which said groups of switches provide access can be arranged in a table wherein each row includes the subgroups of a distinct set and wherein the columns of each pair of columns include the same subgroups, however, with a vertical shift, the shifts in the various pairs of columns being different from one another and the subgroups included in different pairs being different.

11. An automatic telecommunication switching system according to claim 10, in which said table includes at least a single column which includes twice the same subgroups shifted, however, with a vertical shift different from the vertical shifts in said pairs of columns.

12. An automatic telecommunication switching system according to claim 8, in which said control circuits of said first group are incoming junctors and said circuits of said second group are registers.

13. An automatic telecommunication switching system including a switching network with a plurality of groups of switches, in which the switches of each of said groups of switches provide full access between a set of incoming junctors and a set of registers, and the sets of the pair of sets of registers to which the groups of switches of any pair have access respectively, include a minimum number of registers in common.

* * * * *